(12) United States Patent
Plante

(10) Patent No.: US 7,084,875 B2
(45) Date of Patent: Aug. 1, 2006

(54) PROCESSING SCENE OBJECTS

(75) Inventor: Eric Plante, Montreal (CA)

(73) Assignee: Autodesk Canada Co., Montreal (CA)

( * ) Notice: Subject to any disclaimer, the term of this patent is extended or adjusted under 35 U.S.C. 154(b) by 366 days.

(21) Appl. No.: 10/622,009

(22) Filed: Jul. 17, 2003

(65) Prior Publication Data

US 2004/0075663 A1 Apr. 22, 2004

(30) Foreign Application Priority Data

Jul. 19, 2002 (GB) .................................. 0216839.1

(51) Int. Cl.
*G06T 13/00* (2006.01)

(52) U.S. Cl. ..................................................... 345/473
(58) Field of Classification Search ................. 345/474
See application file for complete search history.

(56) References Cited

U.S. PATENT DOCUMENTS

| | | | | |
|---|---|---|---|---|
| 5,241,608 | A | * 8/1993 | Fogel | 382/107 |
| 5,774,183 | A | * 6/1998 | Riek et al. | 375/240.16 |
| 5,786,824 | A | 7/1998 | Sevigny | |
| 5,809,219 | A | * 9/1998 | Pearce et al. | 345/426 |
| 6,211,882 | B1 | 4/2001 | Pearce et al. | |
| 6,229,570 | B1 | * 5/2001 | Bugwadia et al. | 348/441 |
| 6,646,642 | B1 | * 11/2003 | Kanetaka et al. | 345/473 |
| 6,654,020 | B1 | * 11/2003 | Mori | 345/473 |
| 6,708,142 | B1 | * 3/2004 | Baillot et al. | 703/2 |
| 6,891,570 | B1 | * 5/2005 | Tantalo et al. | 348/362 |
| 2004/0005084 | A1 | * 1/2004 | Kondo et al. | 382/107 |
| 2005/0253853 | A1 | * 11/2005 | Sayre et al. | 345/474 |

OTHER PUBLICATIONS

Jonathan Korein & Norman Badler (Jul. 1983). Temporal anti-aliasing in computer generated animation. Computer Graphics v.17 n. 3., p. 377-.388.*
Dave Espinosa-Aguilar et al. (1997). Inside 3D Studio MAX Volumes II and III, Limited Edition. Indianapolis, IN: New Riders Publishing. ISBN 1-56205-669-9 (v. 3).*
Franklin Crow (Nov. 1977). The aliasing problem in computer-generated shaded images. Communications of the ACM, vol. 20 Issue 11.*
Xiao He, Patrick Heynen, Richard Phillips, Kenneth Torrance, David Salesin, & Donald Greenberg (1992). A fast and accurate light-reflection model. Computer Graphics 26(2), Jul. 1992.*

* cited by examiner

*Primary Examiner*—Kee M. Tung
*Assistant Examiner*—Peter-Anthony Pappas
(74) *Attorney, Agent, or Firm*—Gates & Cooper LLP

(57) ABSTRACT

Apparatus for generating image data, including a memory configured to store data defining a volume having a plurality of objects and at least one viewport, a memory configured to store motion data for each of the objects, configuration data for the viewport and instructions, and a processor configured by the instructions to perform the steps of, for each of the objects a position is calculated along its motion path at an interval of a user-specified time period, wherein the interval is dependent upon the shutter length for the object; the object is then translated to this position; the objects are then rendered through the viewport to produce a sample; and when a specified plurality of samples have been rendered they are blended to generate image data wherein each object is independently motion blurred.

24 Claims, 16 Drawing Sheets

PROCESSING SCENE OBJECTS

BACKGROUND OF THE INVENTION

1. Field of the Invention

The present invention relates to generating image data as the blending of a plurality of samples.

2. Description of the Related Art

Advances in the field of digital signal processing have allowed many new developments to be effected in video and film post production. Many sophisticated image modifications and special effects have become widely accepted as part of post-production procedures.

Often, post-production techniques are used to generate additional image data to be composited within frames of original video or film footage, either because said additional image data cannot be realistically committed to movie or video film, for instance if the movie script requires an actor to jump over a mile-wide gap, or because it does not exist, for instance if the movie script requires photo-realistic alien spaceships.

The degree of realism conveyed by such image data is traditionally paramount in order to immerse an audience within the narrative, and techniques are known with which to motion-blur the additional image data when such data portrays moving objects or actors. Motion is usually a function of the position of an object changing in each frame of a sequence of frame. Displaying such a sequence at the appropriate speed, for instance 24 frames per second for movie films, provides the audience with the illusion of movement. Motion-blurring techniques are used to enhance this illusion, and are especially relevant when the object in question is moving at a fast pace. Motion blurring traditionally involves specifying a shutter length indicative of the number of frames to use to evaluate the motion of an object thereon, and a number of samples which defines how many snapshots are taken of each of said frames, whereby said samples are subsequently blended and the output of said blending operation is an output frame showing said object with motion-blur.

A problem however exists in motion-blurring techniques according to the known prior art, in that additional objects as described above have to be independently motion-blurred if artistic considerations or the movie script requires discrete degrees of motion-blurring for each additional object in the same frame, for instance if two alien spaceships are flying at different speeds, because said motion-blurring techniques according to the known prior art require the shutter length and the number of samples be configured for the entire scene or output frame. This may generate visible artefacts which are highly undesirable to convey the required degree of realism.

Moreover, the independent motion-blurring of said additional objects is very resource-intensive, because a separate output frame may be required for each of said motion-blurred objects, to be composited at a later stage with the original movie or video footage.

An embodiment of the invention will now be described by way of example only with reference to the abovementioned drawings.

WRITTEN DESCRIPTION OF THE BEST MODE FOR CARRYING OUT THE INVENTION

FIG. 1

Figure 1:
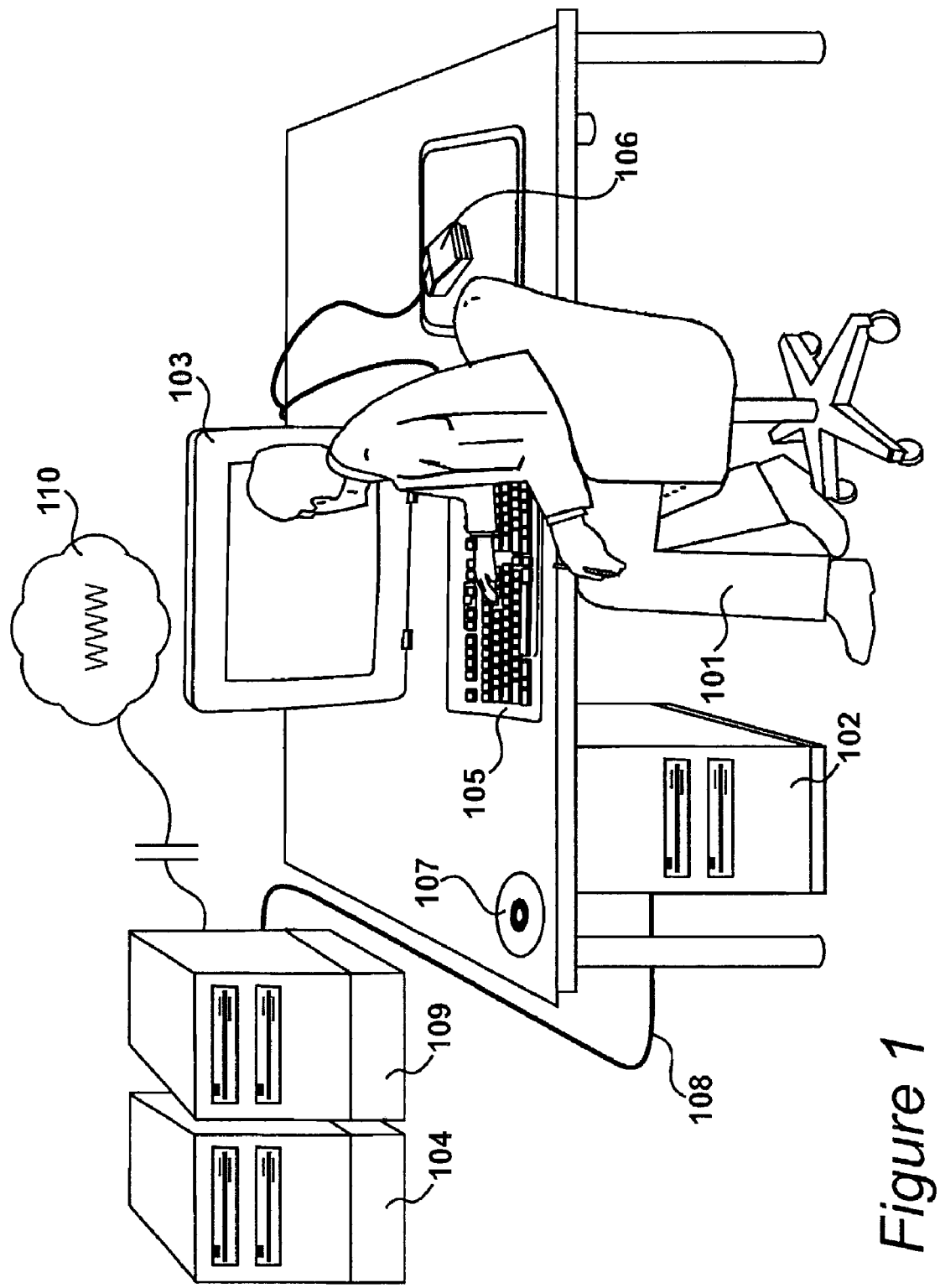
FIG. 1 shows an image processing system operated by an image editor.

Apparatus for generating image data comprises, in this example, a post-production station illustrated in FIG. 1. An image editor 101 controls an image processing environment formed by a processing system 102, a video monitor 103 and a RAID 104, by means of a keyboard 105, and a stylus-operated graphics tablet or a mouse 106. The processing system 102, such as an Octane™ roduced by Silicon Graphics Inc., supplies image signals to the video display unit 103. Moving image data is stored on memory provided by the redundant array of inexpensive discs (RAID) 104. The RAID is configured in such a way as to store a large volume of data, and to supply this data at a high bandwidth, when required, to the processing system 102. The processing system shown in FIG. 1 is optimal for the purpose of processing image and other high bandwidth data. In such a system, the instructions for controlling the processing system are complex. The invention relates to any computer system where processing instructions are of significant complexity.

Instructions controlling the processing system 102 may be installed from a physical medium such as a CD-ROM or DVD-ROM 107, or over a network 108 from a network server 109, including the Internet 110 accessed therefrom. These instructions enable the processing system 102 to interpret user commands from the keyboard 105 and the mouse or graphics tablet 106, such that image data, and other data, may be viewed, edited and processed.

FIG. 2

Figure 2:
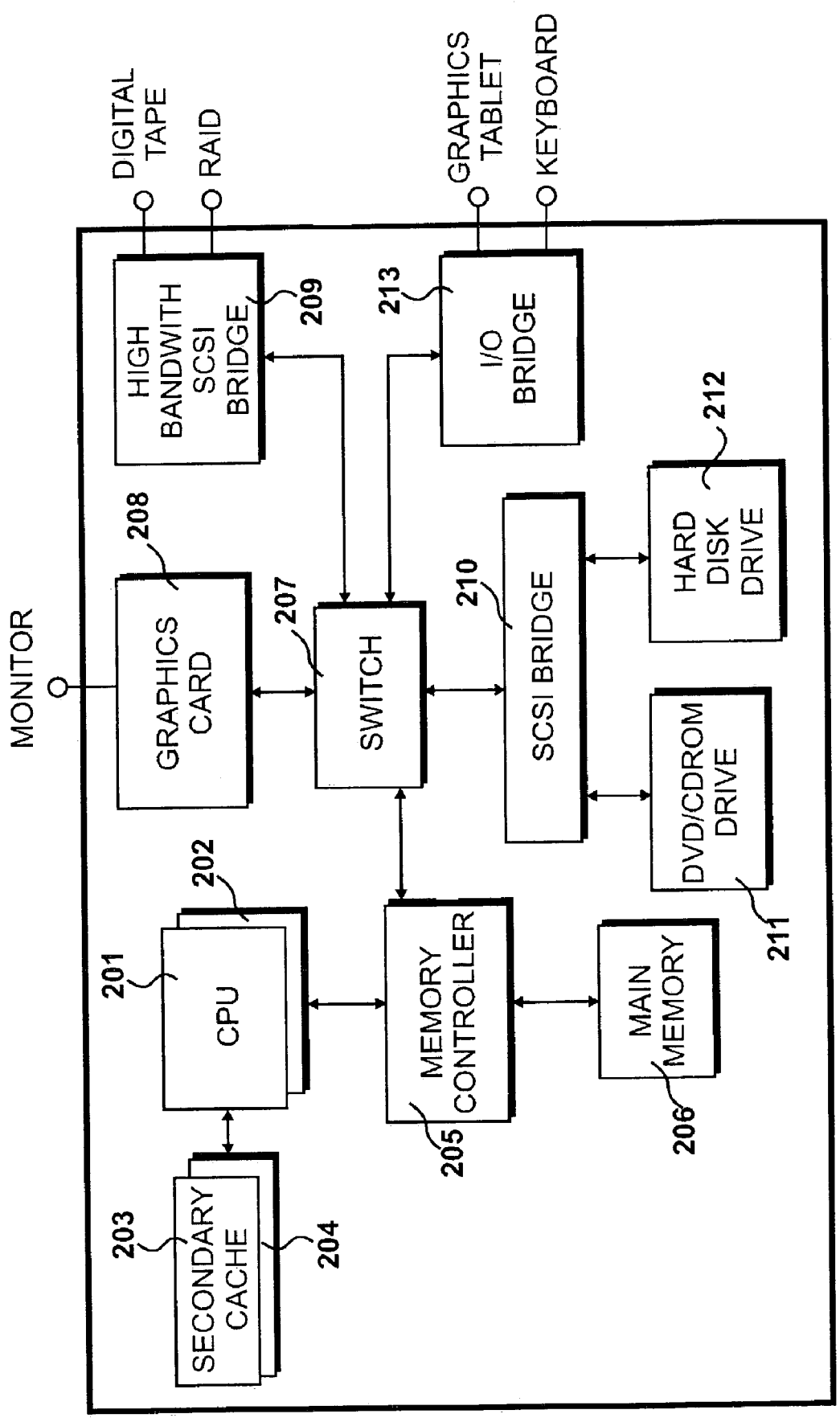
FIG. 2 details the hardware components of the image processing system of FIG. 1 in further detail.

The processing system 102 shown in FIG. 1 is detailed in FIG. 2. The processing system comprises two central processing units 201 and 202 operating in parallel. Each of these processors is a MIPS R10000 manufactured by MIPS Technologies Incorporated, of Mountain View, Calif. Each of these processors 201 and 202 has a dedicated secondary cache memory 203 and 204 that facilitate per-CPU storage of frequently used instructions and data. Each CPU 201 and 202 further includes separate primary instruction and data cache memory circuits on the same chip, thereby facilitating a further level of processing improvement. A memory controller 205 provides a common connection between the processors 201 and 202 and a main memory 206. The main memory 206 comprises two gigabytes of dynamic RAM.

The memory controller 205 further facilitates connectivity between the aforementioned components of the processing system 102 and a high bandwidth non-blocking crossbar switch 207. The switch makes it possible to provide a direct high capacity connection between any of several attached circuits. These include a graphics card 208. The graphics card 208 generally receives instructions from the processors 201 and 202 to perform various types of graphical image rendering processes, resulting in images, clips and scenes being rendered in real time on the monitor 103. A high bandwidth SCSI bridge 209 provides an interface to the RAID 104, and also, optionally, to a digital tape device, for use as backup.

A second SCSI bridge 210 facilitates connection between the crossbar switch 207 and a DVD/CD-ROM drive 211. The DVD drive provides a convenient way of receiving large quantities of instructions and data, and is typically used to install instructions for the processing system 102 onto a hard disk drive 212. Once installed, instructions located on the hard disk drive 212 may be fetched into main memory 206 and then executed by the processors 201 and 202. An input output (I/O) bridge 213 provides an interface for the mouse or graphics tablet 106 and the keyboard 105, through which the user is able to provide instructions to the processing system 102.

FIG. 3

Figure 3:
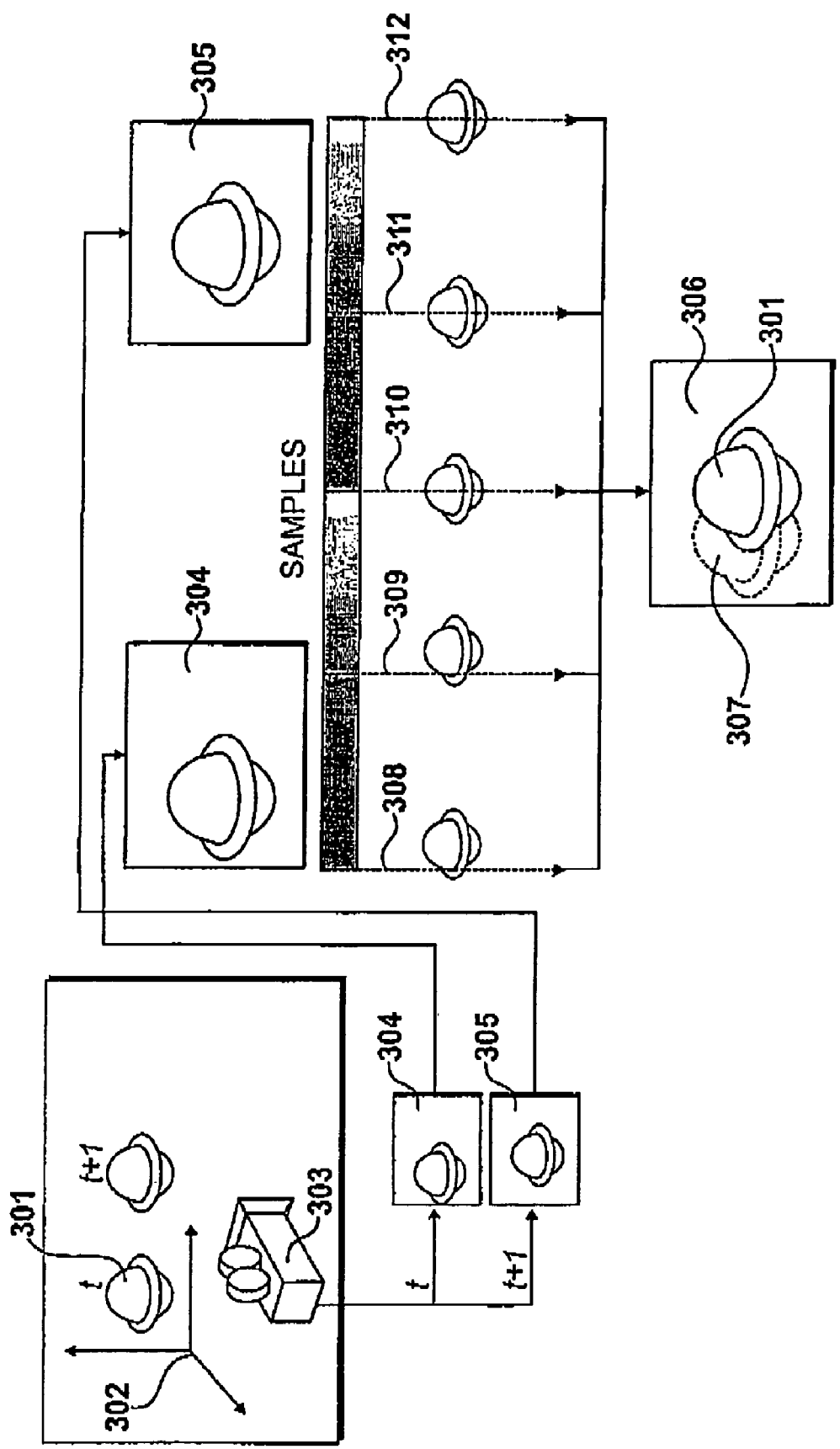
FIG. 3 shows motion blur processing to generate image frames according to the known prior art.

Techniques are known to generate motion blur for an object or talent to be composited in a clip of frames at a later stage, in order to convincingly portray the illusion of movement at speed of said object or talent in the final composited clip. Generating motion blur for an imaginary object according to the known priorart is shown in FIG. 3.

In order to generate a clip portraying, for example, a spaceship 301 travelling at speed, said spaceship 301 is first modelled in a three-dimensional volume 302 with vertices, which eventually define polygons to which textures and a variety of other characteristics may be applied. The volume, or scene 302, is preferably equipped with a viewport 303, the purpose of which is to define a view frustum, the origin of which functions as a camera to render a two-dimensional image of the three-dimensional volume 302 and object 301 therein, as seen through the imaginary camera.

In order to generate the aforementioned motion blur for spaceship 301 according to the known prior art, it is necessary to render a plurality of image frames 304, 305, wherein either spaceship 301 is manually translated within volume 302 after image frame 304 is rendered such that image frame 305 portrays spaceship 301 at a different location, or the position and/or orientation of viewport 303 is altered after image frame 304 is rendered so as to similarly obtain an image frame 305 within which spaceship 301 has moved.

Upon obtaining the two distinct image frames 304, 305, a composite image frame 306 portraying spaceship 301 with motion blur 307 is obtained by sampling each of said frames 304, 305 a number of times. The number of frames sampled, which in this example is two, is known to those skilled in the art as the shutter length, or the sample window size. In the example according to the prior art described above, five samples 308 to 312 are taken with a shutter length of two frames 304, 305.

The samples 308 to 312 are subsequently blended, whereby the two first samples 308, 309 of image frame 304 carry less weight in the five-sample average than the three samples 310 to 312 of image frame 305, such that the latter position of spaceship 301 within image frame 305 is better defined in composited image frame 306 than the previous position of said spaceship 301 within image frame 304, shown as a blur 307.

FIG. 4

Figure 4:
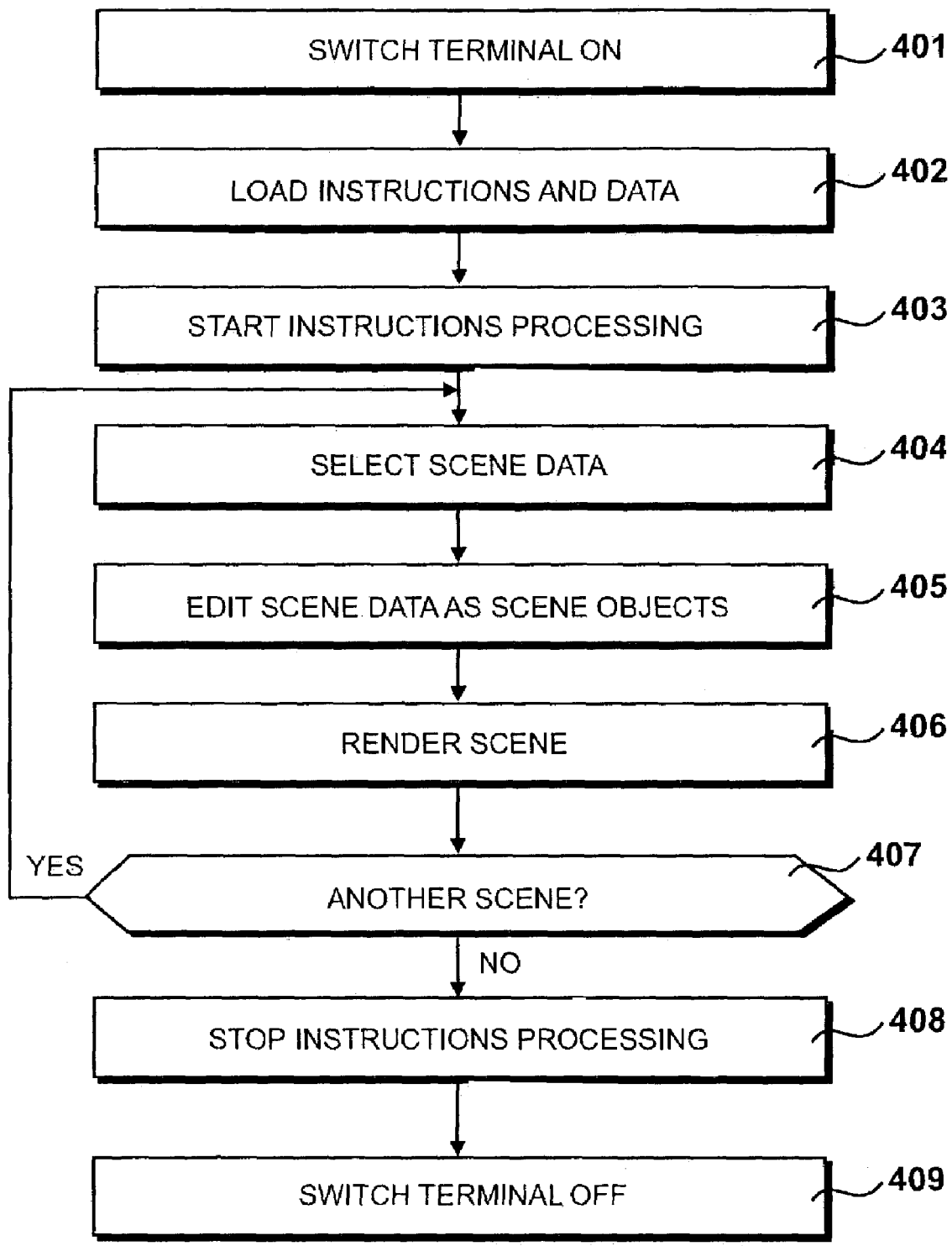
FIG. 4 details the operational steps according to which a user operates the image processing system of FIGS. 1 and 2.

The processing steps according to which the image processing system 102 of FIG. 1 generates image data according to the embodiment described herein are further detailed in FIG. 4.

At step 401, the image processing system 102 is switched on. At step 402, instructions and the data that said instructions configure CPUs 201, 202 to process are loaded from hard disk drive 212, DVD-ROM 107, network server 109 or the internet 110, such that said CPUs 201, 202 may start processing said instructions and data at step 403.

At step 404, a scene is selected which comprises a structure defined as a hierarchy of data processing nodes and a plurality of types of data to be processed therewith.

The processing of said scene data according to said scene structure generates at least one object within a scene or three-dimensional volume configured with at least one viewport, whereby the results of the editing of any of the data defining said object, scene or viewport may be rendered as a frame or a clip of frames at step 406.

At step 407, a question is asked as to whether the scene data of another scene should be edited for subsequent rendering. If the question asked at step 407 is answered in the affirmative, control is returned to step 404, whereby the editor 101 may select a different scene structure.

Alternatively, the scene data rendered at step 406 as edited at step 405 is acceptable for the intended purpose of editor 101, whereby the processing of the instructions started at step 403 may now be stopped at step 408 and, eventually, the image processing system 102 switched on at step 401 may eventually be switched off at step 409.

FIG. 5

Figure 5:
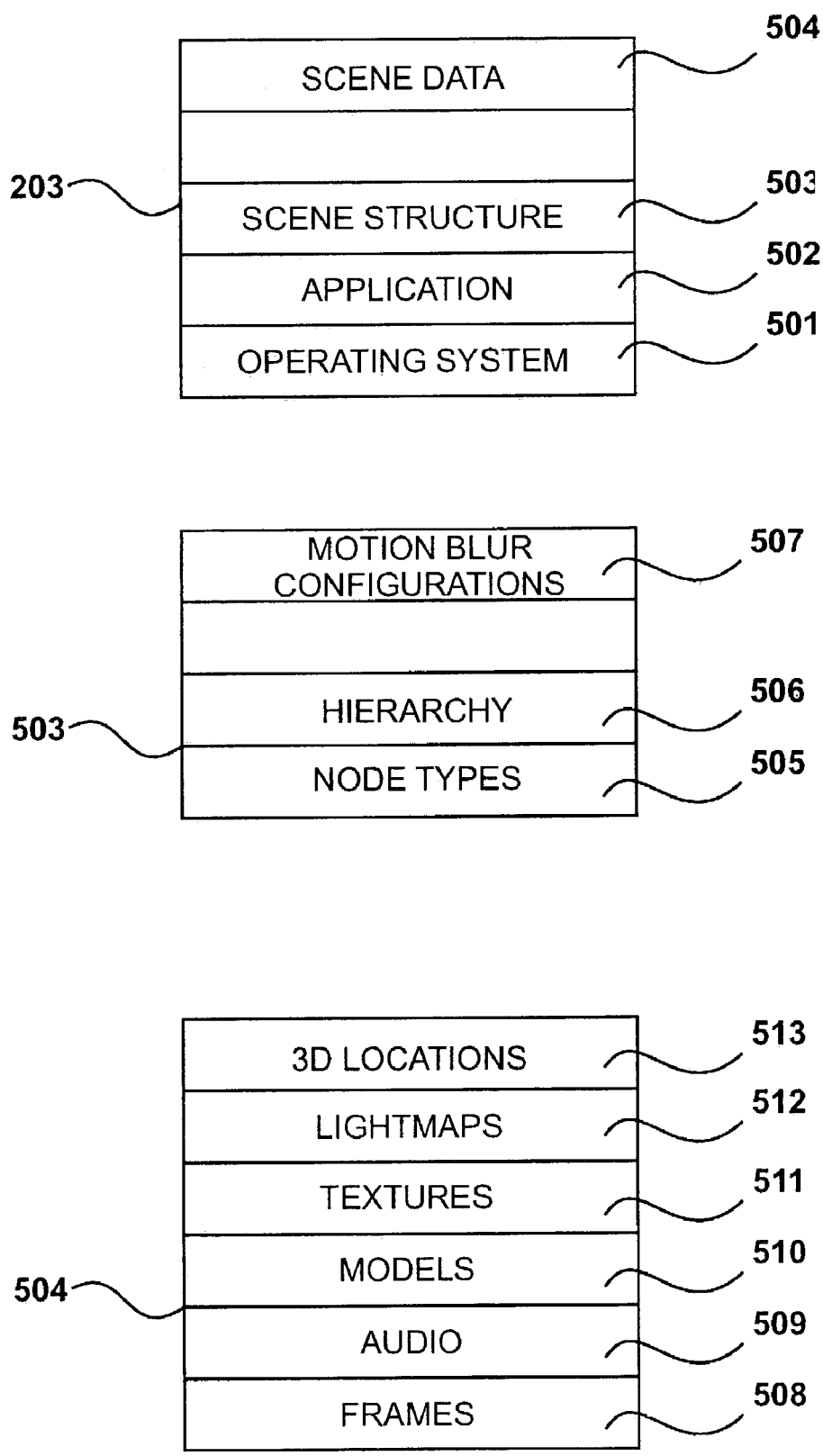
FIG. 5 shows the contents of the main memory shown in FIG. 2 after the step of loading instructions and data shown in FIG. 4.

The contents of the main memory 206 subsequent to the instructions and data loading of step 402 are further detailed in FIG. 5.

An operating system is shown at 501 which comprises a reduced set of instructions for CPUs 201 and 202, the purpose of which is to provide image processing system 102 with basic functionality. Examples of basic functions include access to and management of files stored on hard disk drive 212, or DVD/CD-ROM drive 211, network connectivity with RAID 104, server 109 and the internet 110, interpretation and processing of the input from keyboard 105 and graphic tablet or mouse 106 and graphical data or binary data output. In the example, the operating system is IRIX™ provided by Silicone Graphics Inc, but it will be apparent to those skilled in the art that the instructions of this embodiment may be easily adapted to function with different other known operating systems, such as Windows™ provided by the Microsoft Corporation of Redmond, California or LINUX which is freely distributed.

An application is shown at 502 which comprises the instructions loaded at step 402 and which enables the image processing system 102 to perform processing steps 404 to 407 within a specific graphical user interface displayed on VDU 103. A scene structure is shown at 503 and scene data is shown at 504, which comprises various sets of user input-dependent data and user input-independent data according to which the application shown at 502 generates image data.

Scene structure 503 comprises a plurality of node types 505, each of which provides a specific functionality in the overall task of rendering a scene according to step 406. Said node types 505 are structured according to a hierarchy 506, which may preferably but not necessarily take the form of a database, the purpose of which is to reference the order in which various node types 505 process scene data 504. Scene structure 503 also includes at least one motion blur configuration file 507, the purpose and functionality of which will be further described hereinafter.

A number of examples of scene data 504 are provided for illustrative purposes only and it will be readily apparent to those skilled in the art that the subset described is here limited only for the purpose of clarity. Said scene data 504 may include image frames 508 acquired from framestore 104, audio files 509 such as musical score or voice acting for the scene structure selected at step 404. Said scene data 504 may also include pre-designed three-dimensional models 510, such as a spaceship, and a variety of textures 511 to apply to said models 510. In the example, scene data 504 includes lightmaps 512, the purpose of which is to reduce the computational overhead of CPUs 201, 202 when rendering the scene with artificial light sources. Scene data 504 may finally include three-dimensional location references 513, the purpose of which is to reference the position of the scene objects edited at step 405 within the three-dimensional volume of the scene.

FIG. 6

Figure 6:
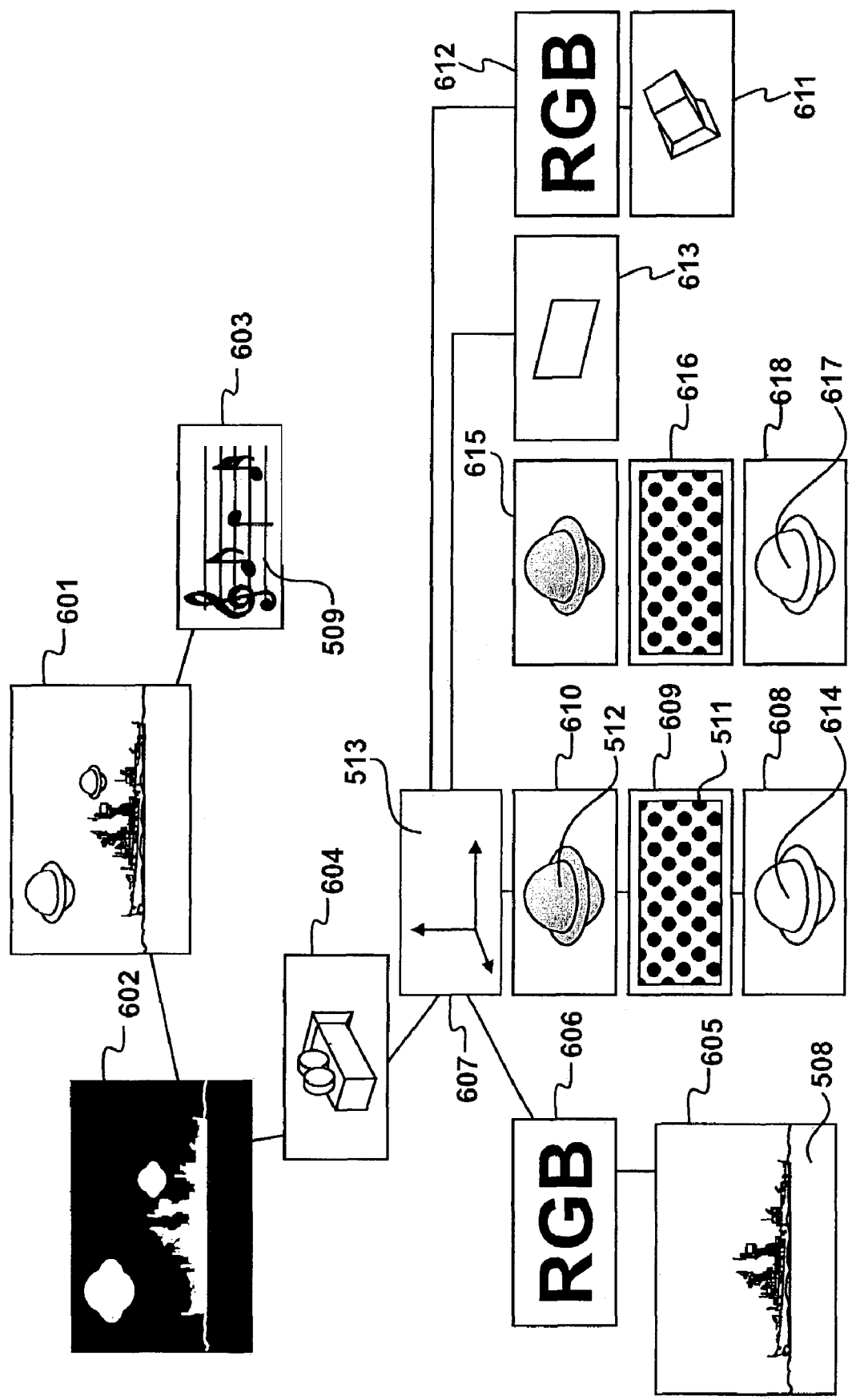
FIG. 6 provides an example of a scene structure including scene data as shown in FIG. 5.

A simplified example of a process tree, is shown in FIG. 6 as the scene structure 503 and scene data 504 loaded into memory 206 at step 402.

Process trees generally consist of sequentially-linked processing nodes, each of which specifies a particular processing task required in order to eventually achieve an output 601, under the form of a composited frame or a sequence of composited frames. Traditionally an output scene 601 will comprise both image data and audio data. Accordingly, the composited scene will thus require the output from an image-keying node 602 and the output of a sound mixing node 603. The image-keying node 602 calls on a plurality of further processing nodes to obtain all of the input data it requires to generate the desired image data. In the example, the desired output image data includes a plurality of frames within which a three-dimensional computer-generated first spaceship object 614 is composited within a background consisting of a clip of frames 508 portraying a ship at sea.

The image-keying node 602 therefore initially requires a viewport rendering node 604 to define a frustum and characteristics thereof within the three-dimensional scene, through which a two-dimensional rendering of three-dimensional objects within a scene may take place. The image-keying node 602 subsequently requires the sequence of frames 508 from frame node 605, each frame of which is processed by a colour-correction processing node 606 and a motion tracking processing node 607, such that a composited three-dimensional first spaceship object 614 generated by three-dimensional modelling node 608, to which is applied a texture 511 by the texturing node 609 and appropriate lightmaps 512 by processing node 610 and which is also motion-tracked by processing node 607, is seamlessly composited within the colour corrected sequence of frames 508.

Additionally, a composited three-dimensional second spaceship object 617 generated by three-dimensional modelling node 618 has a texture applied to it by texturing node 616 and appropriate lightmaps by node 615. This object is also motion-tracked by processing node 607.

In so far as the lighting of the spaceships is concerned, the image keying processing node 602 also requires the output of a spotlight generated by an artificial light processing node 611 within the scene to interact with the lightmaps 512 of first spaceship 614 and second spaceship 617, wherein said artificial light is colour-corrected by a colour-correction processing node 612 providing a functionality similar to the functionality of colour-correction processing node 606. A filter object is preferably generated by a light filtering processing node 613 to prevent the artificial light of said spotlight from altering the colour characteristics of the frames 508 within the scene.

In the preferred embodiment of the present invention, all of the data generated by the above described nodes may be visualised as distinct three-dimensional objects within a scene defined as a three-dimensional volume configured with Cartesian x, y and z co-ordinates, whereby motion tracking processing node 607 processes the x, y and z co-ordinates of each of said objects. The image-keying processing node 602 subsequently overlays said three-dimensional objects as viewed through the frustum generated by node 604.

FIG. 7

Figure 7:
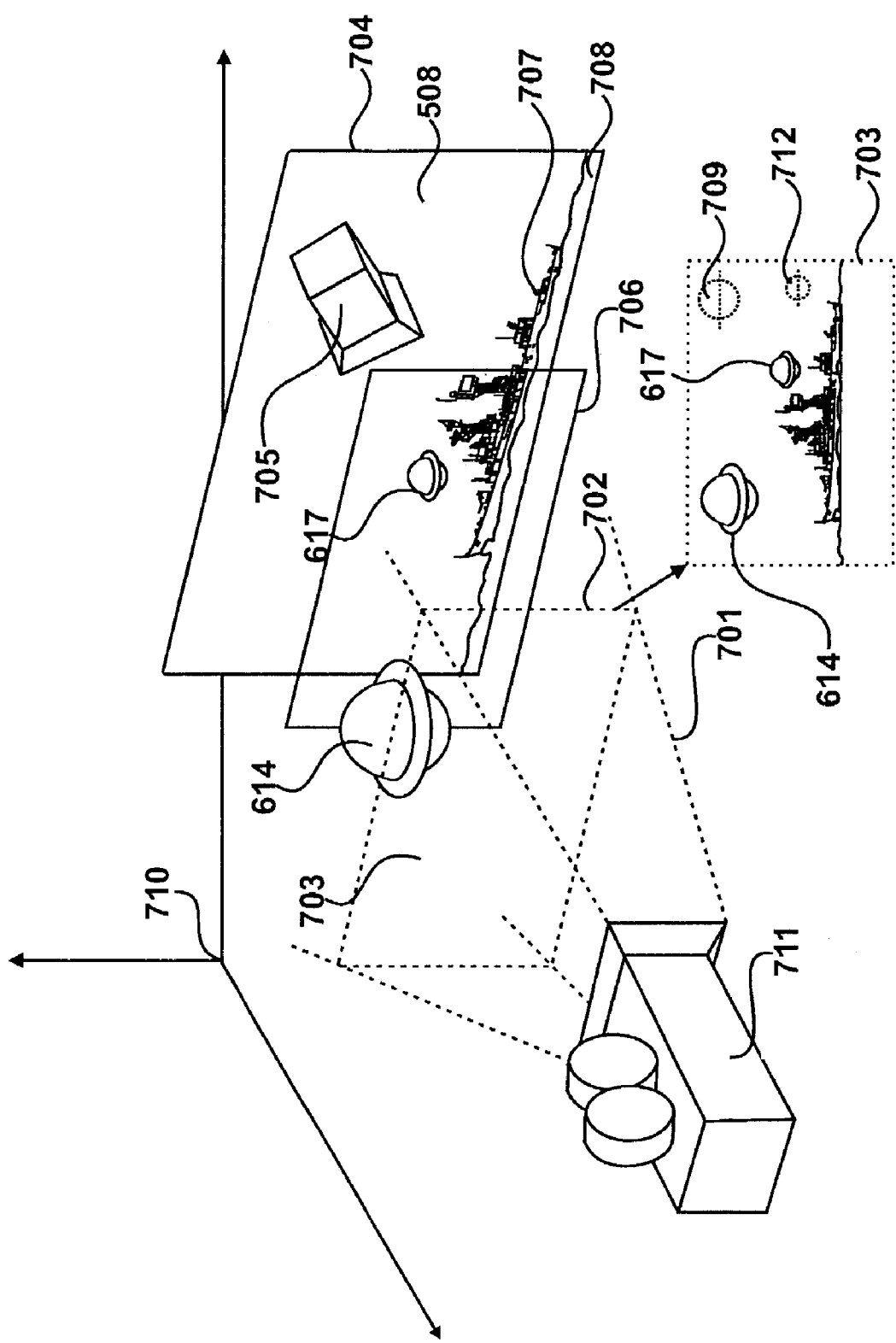
FIG. 7 further details the image data shown in FIGS. 5 and 6 as a plurality of objects, including a viewport, within a three-dimensional volume.

The scene data 504 generated as three-dimensional objects by scene structure 503 described in FIG. 6 are shown within a scene defined as a three-dimensional volume in FIG. 7.

The textured and lightmap-configured first spaceship model 614 and second spaceship model 617 are shown within a scene 710 in relation to the viewport 711 generated by processing node 604. Said viewport is configured with a view frustum 701 and a focal length 702, which jointly define the two-dimensional plane 703 corresponding to the required image output data generated by output processing node 601. Said two-dimensional plane 703 may simply be thought of as the image frame that would be committed to film, were viewport 711 a conventional camera filming three-dimensional objects within scene 710. Said two-dimensional plane 703 will thus be hereinafter referred to as a rendering window.

The clip of frames 508 generated by node 605 is shown as a two-dimensional plane 704 equipped with x, y and z co-ordinates within volume 710, wherein the area of said plane 704 is defined by the resolution in pixels or lines of the image frames 508. Said plane 704 is known to those skilled in the art as a billboard and, depending upon whether the functionality of window 704 allows the entire clip of frames 508 to be played therein, may also be known as a player.

In the example, volume 710 also includes a spotlight object 705 generated by artificial light node 611 and a filter 706 generated by node 613. Said filter 706 is preferably positioned by motion-tracking node 607 between spotlight 705 and player 704 in order to refract artificial light cast by said spotlight 705 within scene 710 to light first spaceship 614 and second spaceship 617 and thus prevent said artificial light from distorting the colour component values of frames 508 within player 704.

The clip of image frames 508 portrays a ship 707 at sea, wherein said image frames were shot with a camera aboard a different ship. Consequently, the combined motions of the ship 707 and the camera aboard said other ship arising from random sea surface movements result in the level 708 of the sea to alter substantially over the entire duration of the clip of frames 508, whereby ship 707 in effect rises and falls along a vertical path within player 704.

Image editor 101 wishes to remove this vertical motion in the composited output clip, effectively tracking a fixed portion of the frame in each frame of the clip of frames 508. However, image editor 101 also wishes to composite, in each of said frames 508, first spaceship 614 as moving at speed towards a position 709 and second spaceship 617 moving at a slightly slower speed to position 712 while ship 707 is stationary. A problem therefore exists in that first spaceship 614 requires a degree of motion blur to realistically convey the impression of said movement at speed, second spaceship 617 requires a lesser degree of motion blur to convey the impression of slower movement, and ship 707 requires no motion blurring at all because it is stationary.

With reference to the known prior art described in FIG. 3, conventional compositing techniques would require image processing system 102 to generate a first clip of frames portraying first spaceship 614 moving towards position 709 with motion blurring, the total number of frames of which equals the total number of frames of the clip of frames 508. A second output clip should then be generated as portraying second spaceship 617 moving towards position 712 with less motion blurring, the total number of frames of which again equals the total number of frames of the clip of frames 508. Finally a third output clip should then be generated as portraying stationary ship 707 with a stable sea level 708, for instance by processing the clip of frames 508 with the "stabiliser with roll" disclosed in U.S. Pat. No 5,786,824 assigned to the Assignee of the present application. The required result would be achieved by keying the first, second and third output clips.

According to the current description, however, the above required output clip is generated by means of defining respective motion paths for each of first spaceship 614, second spaceship 617 and player 704 within scene 710, respectively translating said first spaceship 614, said second spaceship 617 and player 704 along said paths over a period of time equivalent to the duration of clip frames 508, rendering first spaceship 614, second spaceship 617 and player 704 at intervals of said period of time, which is also known to those skilled in the art as sampling, and blending the resulting plurality of samples in order to generate an output image frame or an output clip of image frames.

FIG. 8

Figure 8:
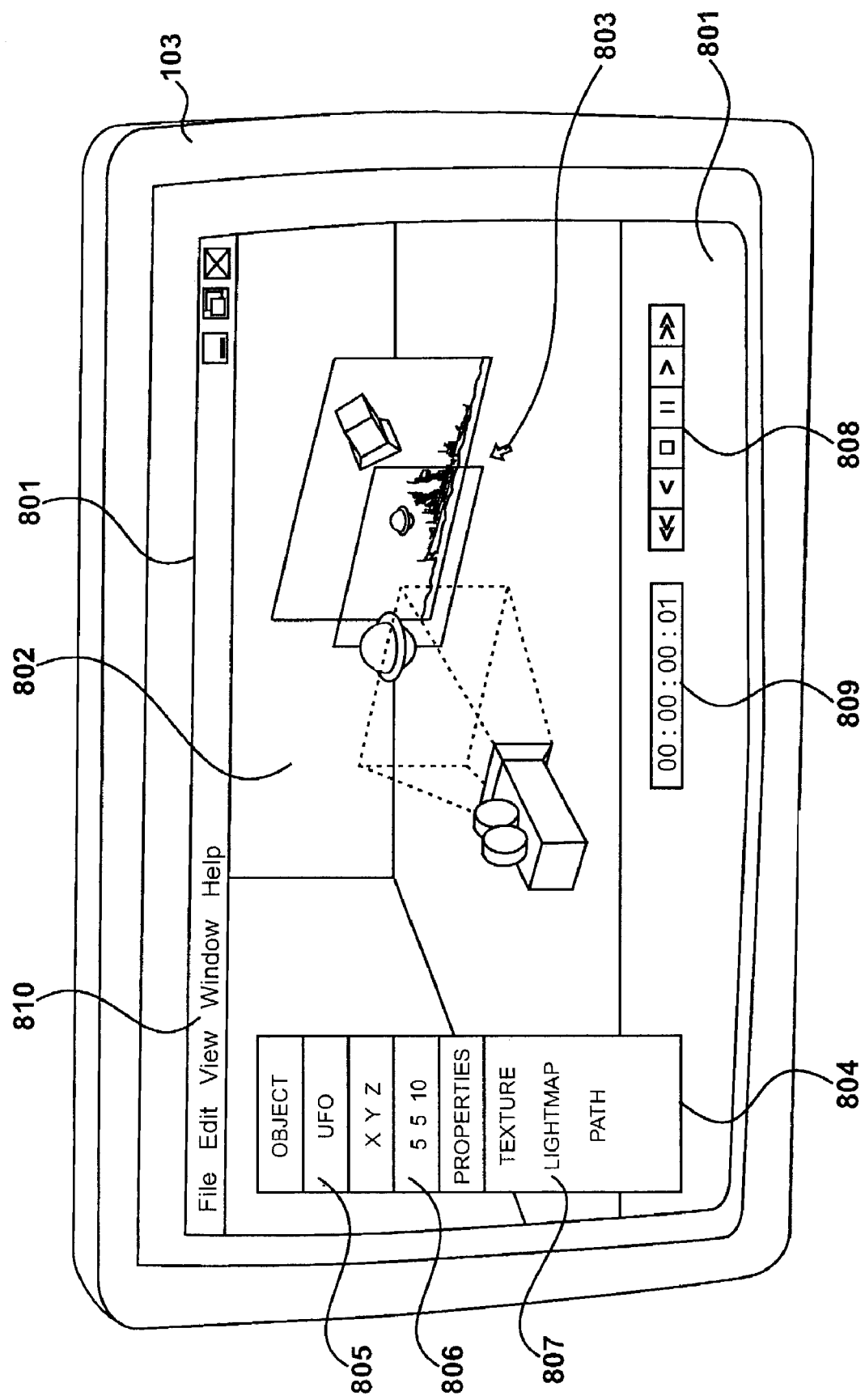
FIG. 8 illustrates the graphical user interface of the application shown in FIGS. 4 and 5, including a graphical representation of the scene structure and scene data shown in FIGS. 6 and 7.

The graphical user interface (GUI) of the application 502 is shown in FIG. 8, including a graphical representation of the scene structure 503 and scene data 504 shown in FIGS. 5 and 6 and further described in FIG. 7.

The GUI 801 of image processing application 502 is preferably divided into a plurality of functional areas, most of which are user-operable. A first area 802 displays scene structure 503 as three-dimensional scene 710. Said scene 710 is preferably displayed with including scene data 504 graphically depicted as scene objects 614, 711 and 701 to 708.

A cursor 803 is displayed which is user operable by means of mouse or graphic tablet 106 and may be positioned by image editor 101 over any portion of GUI 801 to select a variety of functions or tasks within said plurality of functional areas. Thus, within scene display area 802, cursor 803 may be used to select a particular object, for instance first spaceship 614, whereby a second user operable area 804 conveys data properties, parameters and/or values specifically pertaining to said selected object. Preferably, second object information display area 804 includes an object identifier portion 805, an object location portion 806 and an object properties portion 807. Portions 805 and 806 of second display area 804 are updated according to which object cursor 803 selects within scene 302 and portion 807 may be subsequently interacted therewith by means of said cursor 803 to edit any of the selected object's properties.

A third display area 808 comprises conventional user-operable clip navigation widgets allowing image editor 101 to respectively rewind, reverse play, pause, stop, play or fast forward the sequential order of image frames generated from scene 710 by means of rendering window 703. Alternatively, said navigation widgets 808 also provide the same functionality as described above for player 704 if said player is selected as a scene object by means of cursor 803. A counter area 809 is provided in close proximity to the clip navigation widget 808, which is divided into hours, minutes, seconds and frames, such that the aforementioned navigation by means of navigation widgets 808 may be carried out with precision and provide a valid point of reference to image editor 101.

A fourth display area 810 provides a conventional bar of menus operable by means of cursor 803, which provide a variety of functions and processes, for instance with which to load or store image data, further configure the size and contents of display areas 802, 804 and 808 or, eventually, stop processing the instructions according to step 409.

FIG. 9

Figure 9:
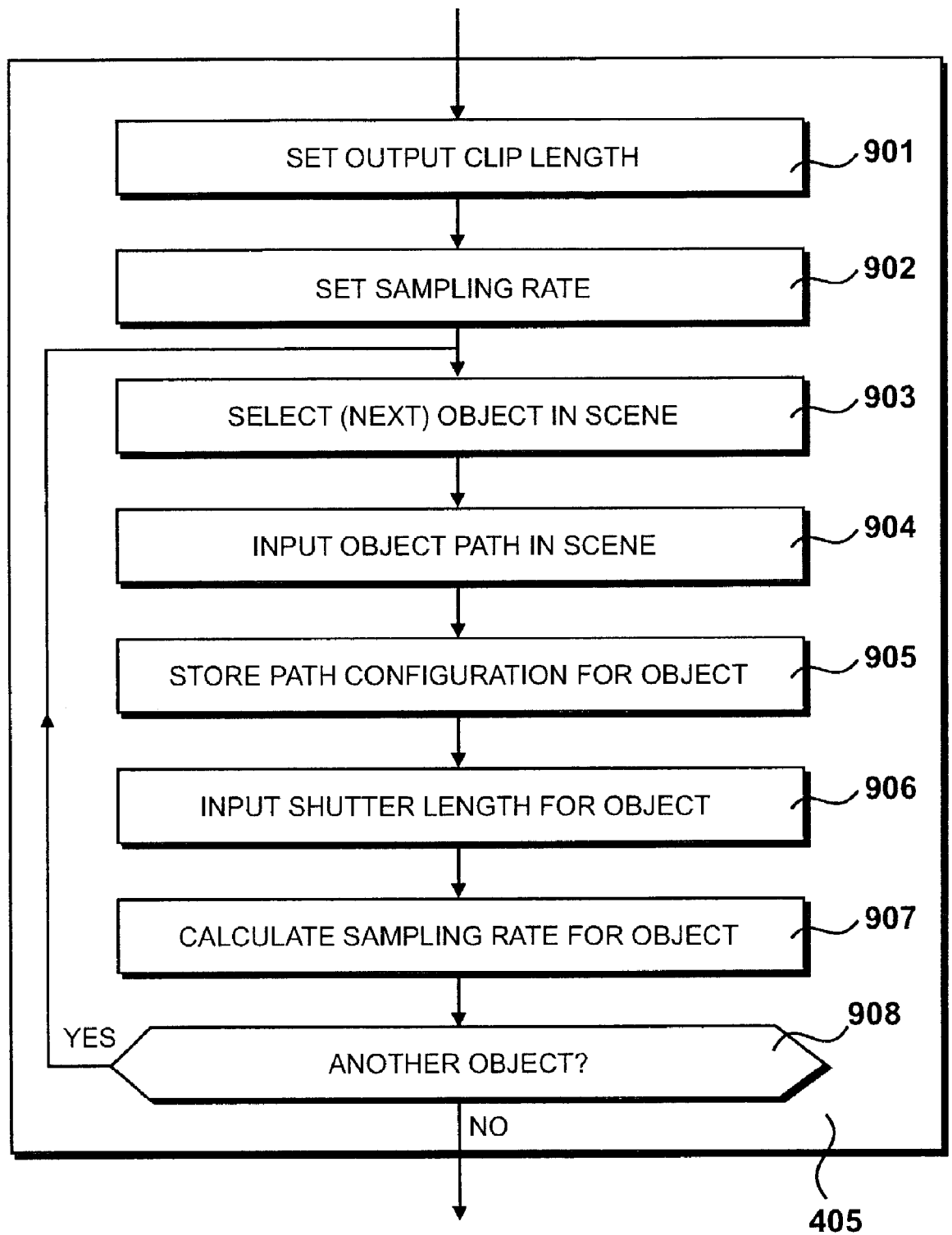
FIG. 9 details the processing steps involved for editing scene data shown in FIGS. 4 to 7 as scene objects shown in FIG. 8.

The processing step 405 according to which scene data 504 is edited as scene objects shown in FIGS. 7 and 8 is further described in FIG. 9.

At step 901, the required output clip length is set. Said length may be understood as the number of output image frames node 602 should render through rendering window 703 in order to generate a complete sequence of frames defining a clip. At step 902 the number of samples per frame is set. This defines how many samples should be taken and stacked per output frame. More samples may give a better effect but take longer to render. In this example the user sets four samples per frame. However this input and the input at step 901 may each be either automatically calculated or input by user 101.

At step 903 a first object such as first spaceship 614 is selected in the scene 710, for instance by means of cursor 803 for motion data to be input. A path is subsequently defined for said selected object within said scene 710 at step 904, for instance by selecting the "path" property of said object within object's properties portion 807.

In this example said path is linear and comprises a directional vector, the origin which is defined by the x, y and z co-ordinates of the object selected at step 903 and the extremity of which is defined by the x, y and z co-ordinates of said object subsequent to image editor 101 dragging said object 614 to position 709, for instance with using cursor 803 in a "click and drag" configuration, which is well known to those skilled in the art. However, alternative paths include a spline-based curve, for instance to impart a "bobbing" motion to first spaceship 614, or a function, for instance the tracking function disclosed in U.S. Pat. No. 5,786,824 referenced above, wherein said function itself generates a linear or spline-based movement vector. A further alternative path is no movement at all, that is the x, y and z co-ordinates are equal for any time value. This might be appropriate if ship 707 were already stationary, in which case player 704 would not require tracking. The path configuration input at step 904 is subsequently stored at step 905 as three-dimensional locations 513 specifically for the object selected at step 903. The skilled reader will understand that there are many ways of generating or defining movement paths, including any explicit, implicit or parametric continuous or non-continuous function or even a simple table of values. Any method that produces a three-dimensional position in response to an input of A frame number would be suitable herein.

At step 906 a shutter length for the selected object is input and at step 907 the sampling rate for the object is calculated. This is the ratio of the shutter length and the number of samples per frame input at step 902, which in this example is four. For example, the user may set a shutter length of two frames for first spaceship 614 and of one frame for second spaceship 617. This would give a sampling rate of half a frame for first spaceship 614 and of a quarter of a frame for second spaceship 617. The sampling rate defines the time value that is input into the motion path to create the position of each object for each sample. The shutter length for player 704 is set to zero since the ship 707 should have no motion blur.

A question is subsequently asked at step 908 as to whether motion data, comprising a path and a shutter length, should be defined for another object in scene 710. If the question asked at step 908 is answered in the affirmative control is returned to step 903, whereby said next object may be selected and its motion data defined and stored. Alternatively, if the question of step 906 is answered in the negative then step 405 is concluded.

According to the prior art, and with reference to FIG. 3, shutter length and the number of samples are traditionally specified for the entire scene. Specifying the shutter length and number of samples for the entire scene 710 according to said prior art would result in identical motion blurring for the first and second spaceships and the ship, when in fact they should have differing amounts. Therefore a shutter length is input for each object in scene 710 independently of the shutter length for other objects in the scene and of the total number of frames required for the scene, whereby it is thus possible to generate a two-dimensional image frame within which each of said plurality of objects is rendered with its own degree of motion blurring such that, in the example, the ship 707 has no motion blurring whilst appropriate motion blurring is convincingly provided for first spaceship 614 and second spaceship 617. Individual shutter lengths for each object specify the amount of motion blur to be applied to that object. The longer the shutter length, the more the blur.

FIG. 10

Figure 10:
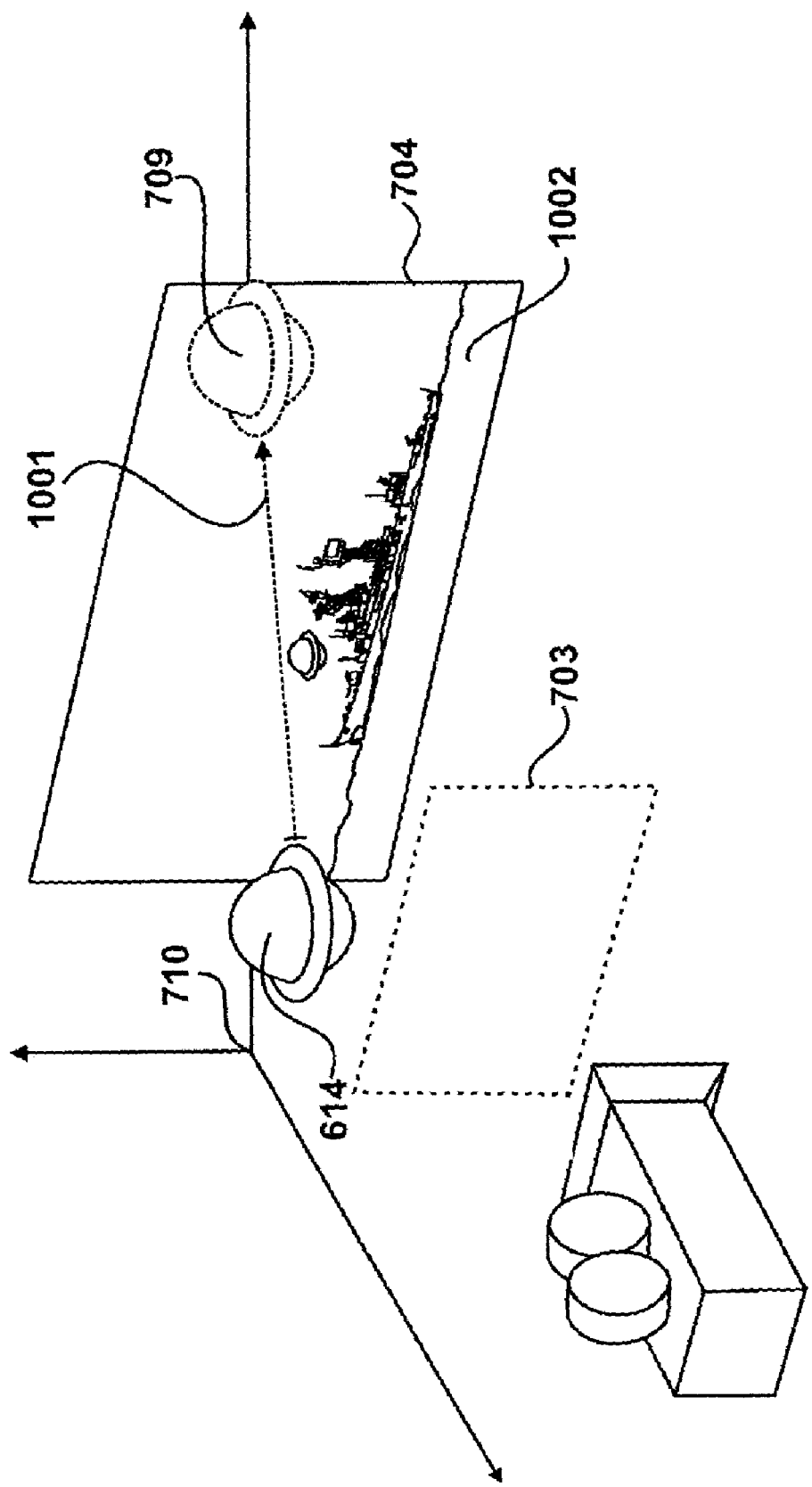
FIG. 10 graphically illustrates the step of equipping an object in the scene of FIGS. 6 to 8 with a motion path as shown in FIG. 9.

The processing step 903 of equipping an object in scene 710 with a motion path is graphically illustrated in FIG. 10.

With reference to the description of step 903, image editor 101 first selects first spaceship object 614 with cursor 803 and drags it within scene 710 to location 709, whereby a linear directional vector 1001 is defined with an origin, the x, y and z co-ordinates of which are obtained from the location of said object 710 before interaction therewith, and an extremity 709, the x, y and z co-ordinates of which within scene 710 are derived from the location at which the cursor 803 releases first spaceship 614 after dragging. The user also specifies the number of frames taken for the first spaceship to reach location 709.

Preferably first spaceship 614 is selected according to step 903, whereby cursor 803 subsequently selects the path property of said object within portion 807 such that application 502 initiates the vector origin and continually reads the input data of mouse or graphic tablet 106, e.g. cursor 803, to define the length and orientation of said vector within scene 710.

Similarly, user 101 selects the player 704 as a next object in scene 710 according to step 902, again selecting the path property of said player within updated portion 807 but specifying said path as a tracking function as opposed to a directional vector. Image editor 101 may subsequently select a two-dimensional x, y portion 1002 of the image frame area within player 704, whereby said portion will be tracked in each subsequent frame in said frame display area of said player 704 by means of calculating a movement vector, the inverse of which will be applied to player object 704 such that the x, y portion 1002 remains stable in relation to the two-dimensional rendering window 703.

The user may then specify a movement path for second spaceship 617 and a tracking function for player 704. Any method of inputting paths or retrieving saved paths is appropriate. Individual motion paths are therefore defined for a number of objects representing scene data within scene 710.

FIG. 10A

Figure 10A:
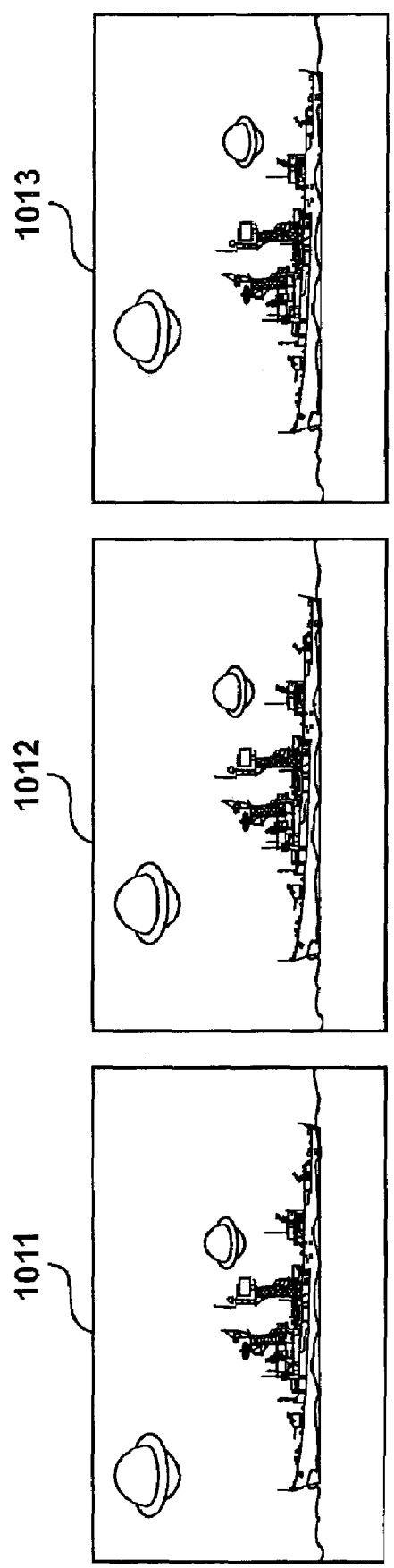
FIG. 10A graphically illustrates a prior art clip of frames.

FIG. 10A shows three frames of a clip of frames that could be produced by a prior art system, or by the system described herein by specifying no motion blurring. For the purposes of clarity, only three output image frames 1011, 1012 and 1013 are shown from an output clip including potentially hundreds or even thousands of image frames.

For each frame the position of each object, as specified by its motion path, is calculated and the scene is viewed through rendering window 703. The time taken is counted in frames, and so for each frame the frame number is input into the motion path veqtor, function or table for each object. This gives a three-dimensional position for each object. As shown, spaceship 614 moves more quickly than spaceship 617. Although ship 707 is shown as stationary the position of player 704 changes each frame according to the tracking function. This compensates for the movement of ship 707 within the player 704.

These three frames do not include motion blurring and are included herein to show the fast movement of first spaceship 614, the slower movement of second spaceship 617 and the lack of movement of ship 707. The skilled reader will appreciate that the movement shown is exaggerated for illustration purposes, since in reality the movement from frame to frame, even of a very fast-moving object, is barely detectable by the human eye.

FIG. 11

Figure 11:
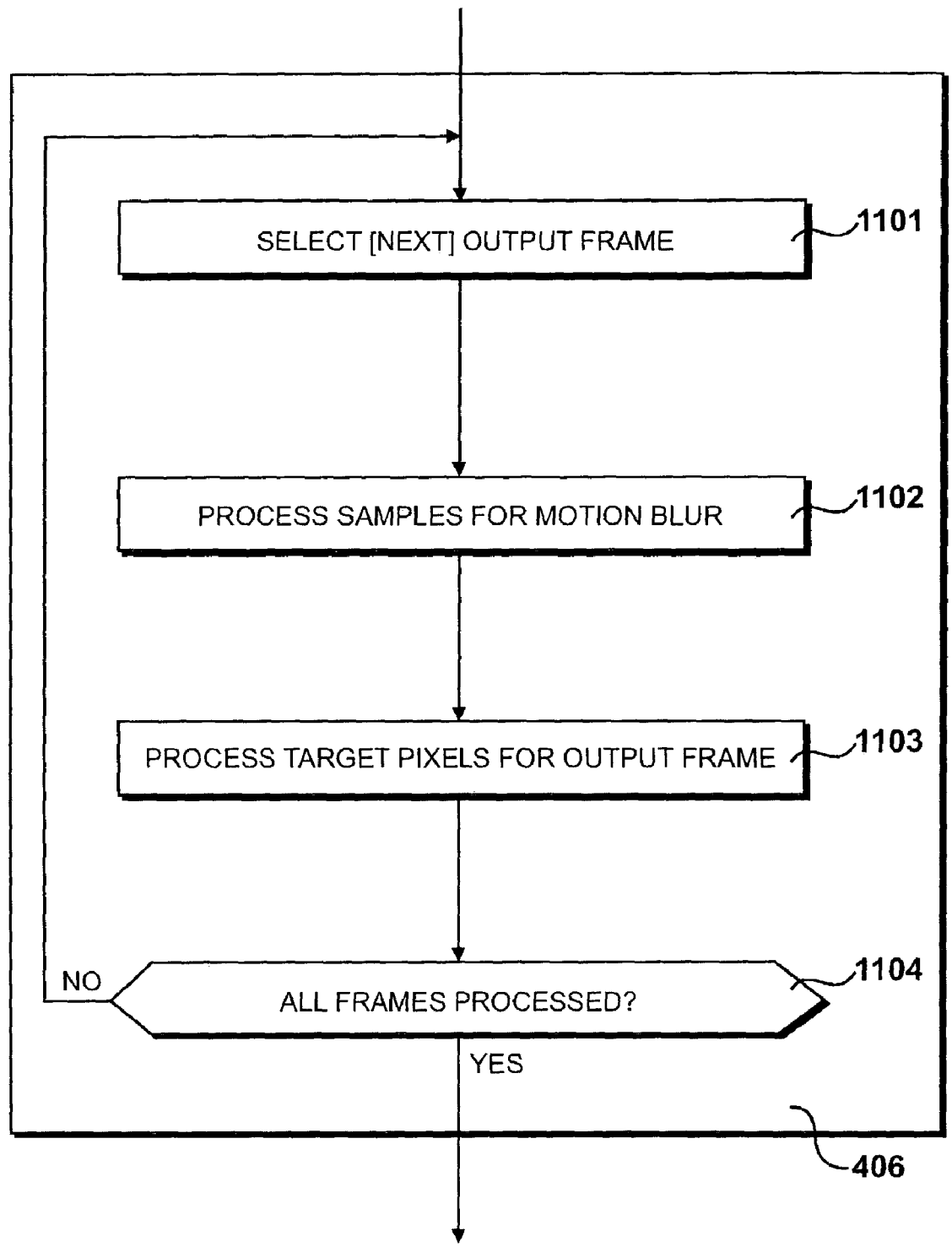
FIG. 11 details the processing steps according to which image data is rendered as shown in FIG. 4.

The processing steps according to which image data edited as scene objects is rendered at rendering step 406 are further detailed in FIG. 11.

At step 1101, a frame counter is initialised with the number of frames defined by the output clip length configured at step 901 and the first frame of the output clip or output image frame is selected for rendering.

At step 1102 samples, the number of which is set by the input at step 902, are rendered in order to generate the image data required to create the respective degree of motion blurring for each of the objects in scene 710 to be rendered as viewed through rendering window 703. Upon generating the required image data as samples of picture screen elements, also known as pixels, each of which having red, green and blue (RGB) colour component values, said samples are processed in order to generate the target pixels defining the output image data, i.e. the output frame, at step 1103.

At step 1104 the number of the output frame generated at step 1103 is subtracted from the number of frames initialised in the counter at step 1101, whereby a question is asked as to whether all the frames of the required output clip have been rendered. If the question of 1104 is answered in the negative control is returned to step 1101, whereby the next output frame is selected for rendering according to steps 1102 and 1103 and the counter further decreased at step 1104, until such time as question 1104 is answered in the affirmative whereby all of the required output image data has been rendered.

FIG. 12

Figure 12:
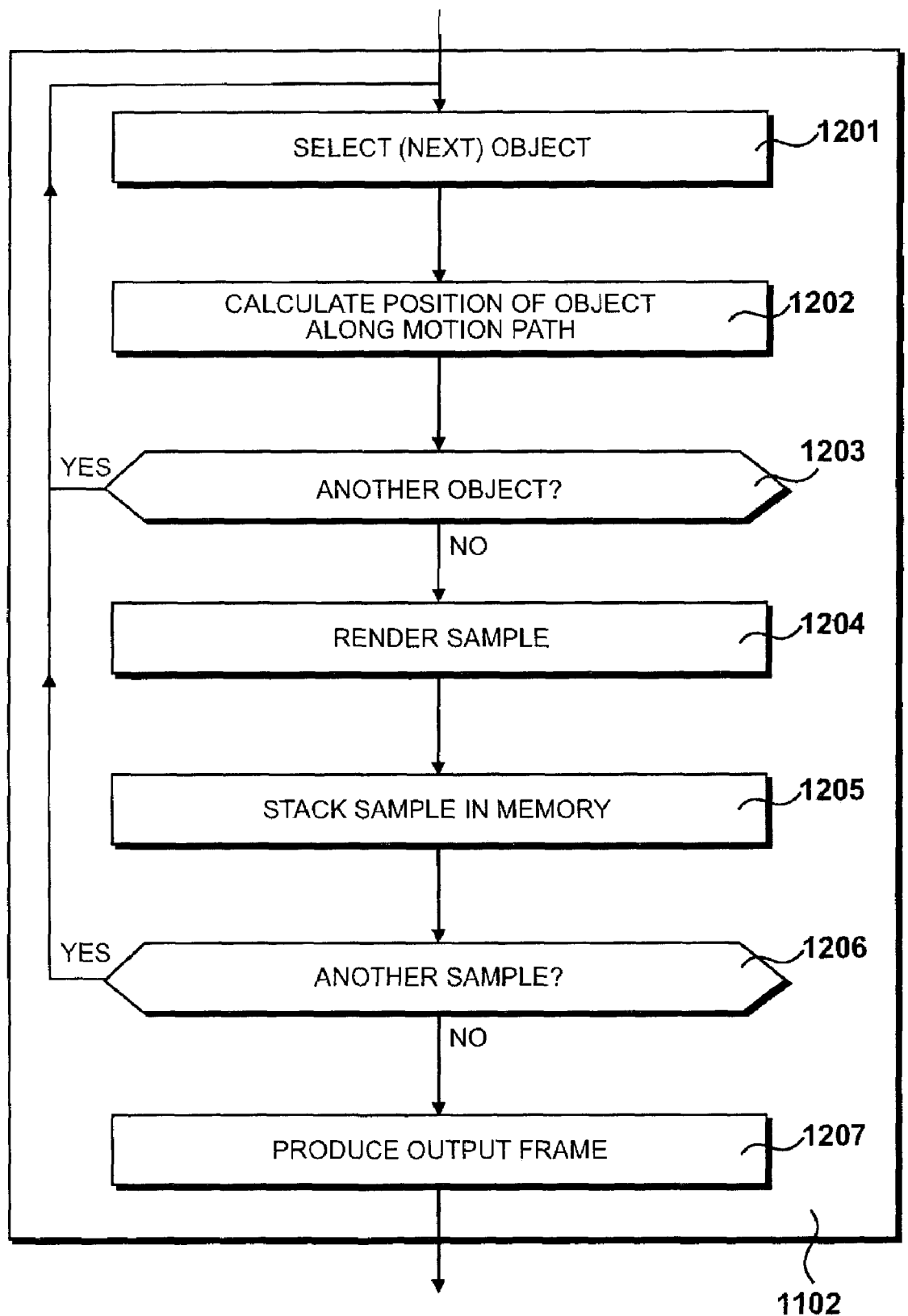
FIG. 12 further details the processing steps according to which samples are processed to generate motion blur shown in FIG. 11.

The processing steps according to which samples are processed at step 1102 in order to generate image data to create motion blur are further detailed in FIG. 12.

At step 1201 the first object in the scene is selected and at step 1202 its x, y and z co-ordinates within scene 710 are calculated according to its motion path and sampling rate. For the first sample of any frame the input into the objects' motion paths is the frame number. In this example, for the first sample of the first frame the input is one, which gives the object's starting point. However, after that the input is given by the object's sampling rate. At step 1203 a question is asked as to whether there is another object whose position should be calculated, and if this question is answered in the affirmative then control is returned to step 1201.

If it is answered in the negative then at step 1204 the sample frame is rendered according to the view through rendering window 703 and at step 1205 the sample is stacked in memory. At step 1206 a question is asked as to whether there is another sample to be rendered and if this question is answered in the affirmative then control is returned to step 1201 and the first object is selected to have its position recalculated. In this example, first spaceship 614 has a sampling rate of half a frame and so its position half a frame after its starting position is calculated. Second spaceship 617 has a sampling rate of a quarter of a frame and so its position a quarter of a frame after its starting position is calculated. Player 704 has a sampling rate of zero and so its position does not move.

If the path of an object is a function then usually it will accept an input of a fraction. However some paths, for example lookup tables, may need interpolation to provide the sub-frame positions. Additionally, for the final frame extrapolation beyond the end of the path may be necessary.

If the question asked at step 1206 is answered in the negative, to the effect that the total number of samples for the frame has been taken, then at step 1207 the samples are superimposed upon one another to produce the output frame.

FIG. 13

Figure 13:
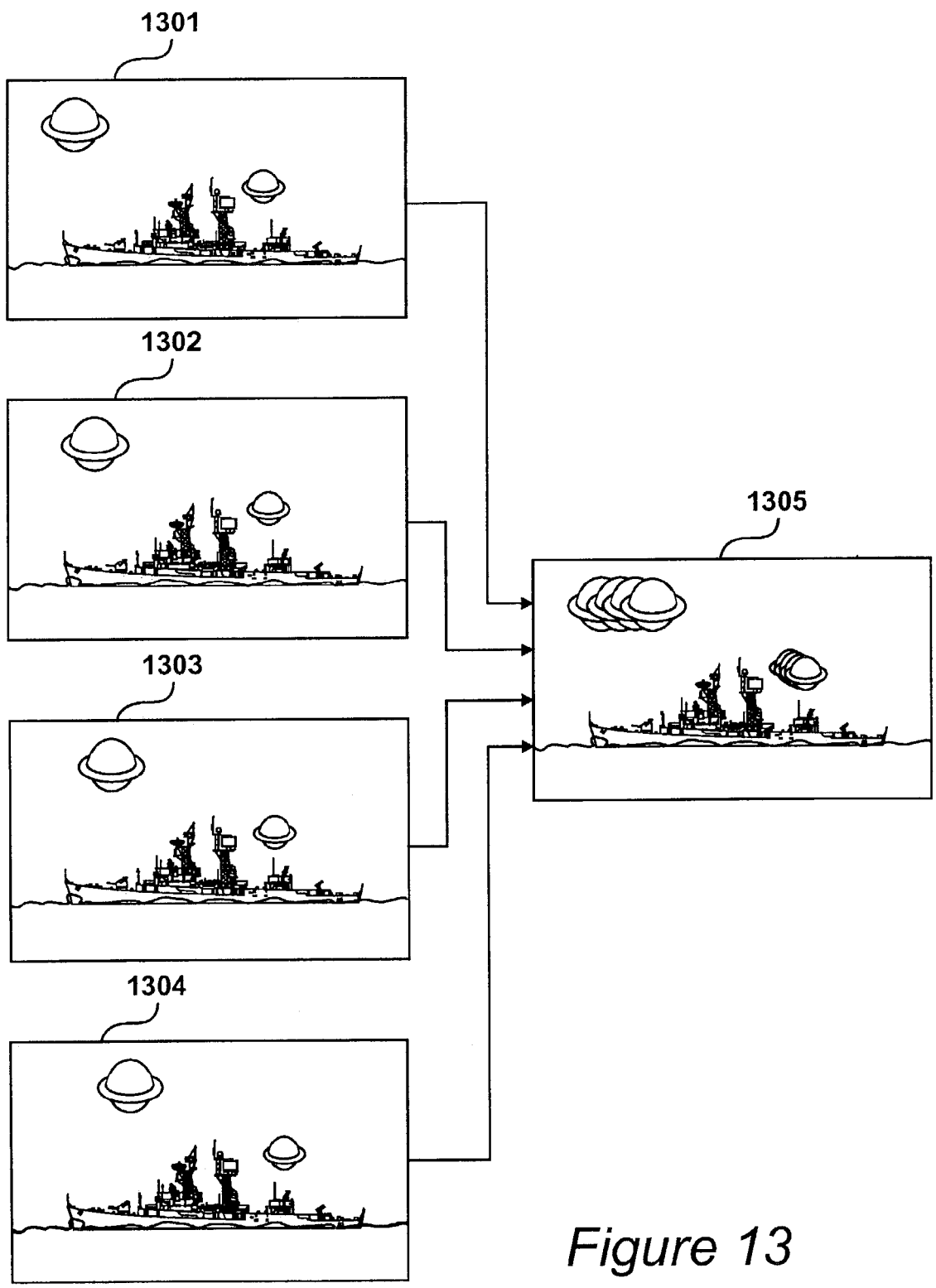
FIG. 13 shows the objects shown in FIG. 10 sampled and stacked in the memory as shown in FIG. 12.

A graphical representation of the sampling and stacking of processing steps 1204, 1205 as well as the generation of the output frame at step 1207 is provided in FIG. 13.

In the example, it was previously explained that ship 707 should have no motion blurring whatsoever whereas first spaceship 614 and second spaceship 617 require different degrees of motion blurring to convey the impression of movement at speed. Moreover, in the preferred embodiment of the present invention, only a tracked portion of player 704 is required for the final output image data.

Consequently, image editor 101 specifies a shutter length of zero frames for player object 704. This gives a sampling rate of zero, so that the x, y and z position of said player object 704 will only be calculated for whole frame numbers and thus during a single frame the object will appear immobile regardless of the number of samples taken and stacked according to steps 1204 and 1205. Using the analogy of a camera, it is of course meaningless to specify that a shutter is open for no time and yet generates an image. However, in the current context, if the number of samples taken is over the smallest fraction of a frame possible then all the samples will be virtually identical. Thus the shutter length for object 704 can be thought of as tending to zero. When the next frame is sampled the player's position will be calculated by inputting that frame number into the tracking function that keeps ship 707 stationary and it will be in this position for all the samples taken for the next frame.

Conversely, image editor 101 specifies a shutter length of two frames for first spaceship object 614, such that the number of samples specified for the scene at step 907 is equally divided between two frames' worth of the motion path. Also, user 101 specifies a shutter length of one frame for second spaceship 617, which means that the number of samples is only taken from a single frame's worth of the path.

This system gives uniform sampling. Weighted sampling is achieved by using a more complex calculation of the sampling rate than a simple ratio, usually requiring a weighting constant as well as the shutter length and number of samples per frame. For example, more samples could be taken near to the end of the shutter length than at the beginning. The concepts of both uniform sampling and weighted sampling will be familiar to those skilled in the art and, for the purpose of clarity, only uniform sampling will be described in the present description. Alternatively, using uniform sampling but a weighted average for the generation of the output frame gives a similar effect to weighted sampling.

In the example, at step 902 it is specified that the number of samples per frame to be taken and stacked to generate each output image frame is four. Thus four samples are taken and stacked according to steps 1204 and 1205. These are shown at 1301, 1302, 1303 and 1304. Ship 707 is stationary for all four samples since it has a shutter length of zero.

In sample 1301 both spaceships are at the origin of their paths, since the input into their motion path functions is one. In sample 1302 spaceship 614 is at a position halfway between its position in the first frame of the clip, as shown in FIG. 10A at 1011, and the second frame, as shown at 1012. In sample 1303 it is at the same position as in frame 1012 and in sample 1304 it is at a position halfway between frame 1012 and the third frame, frame 1013. Thus four samples are taken of spaceship 614 over a shutter length of two frames, that is at one frame, one and a half frames, two frames and two and a half frames.

Spaceship 617 has a shutter length of one frame and so in sample 1302 it is at a position of a quarter of a frame after its starting point, in sample 1303 it is at a position of half a frame after its starting point and in sample 1304 it is at a position of three quarters of a frame after its starting point.

Thus frame 1305 is the superposition of the four samples 1301 to 1304, the sum total of the colour component values of each corresponding pixel of which is divided by the total number of samples to provide a single image frame comprising the target pixels. Ship 704 is stationary, second spaceship 617 has a small amount of motion blur and first spaceship 614 has a lot of motion blur.

In this example the interpolated samples were taken after the beginning of each frame. In another embodiment of the invention it is possible for the user to specify a value for phase, to indicate whether the samples are taken before, around or after the frame. In this case extrapolation could be needed to obtain positions before the first frame.

Thus there is provided apparatus for generating image data, comprising memory means configured to store data defining a volume comprising a plurality of objects and at least one viewport, memory means configured to store motion data for each of said objects, configuration data for said viewport and instructions, and processing means configured by said instructions to perform the following steps. For each of the objects a position is calculated along its motion path at an interval of a user-specified time period, wherein the interval is dependent upon the shutter length for the object. The object is then translated to this position. The objects are then rendered through the viewport to produce a sample. When a specified plurality of samples have been rendered they are blended to generate image data wherein each object is independently motion blurred.

FIG. 14

Figure 14:
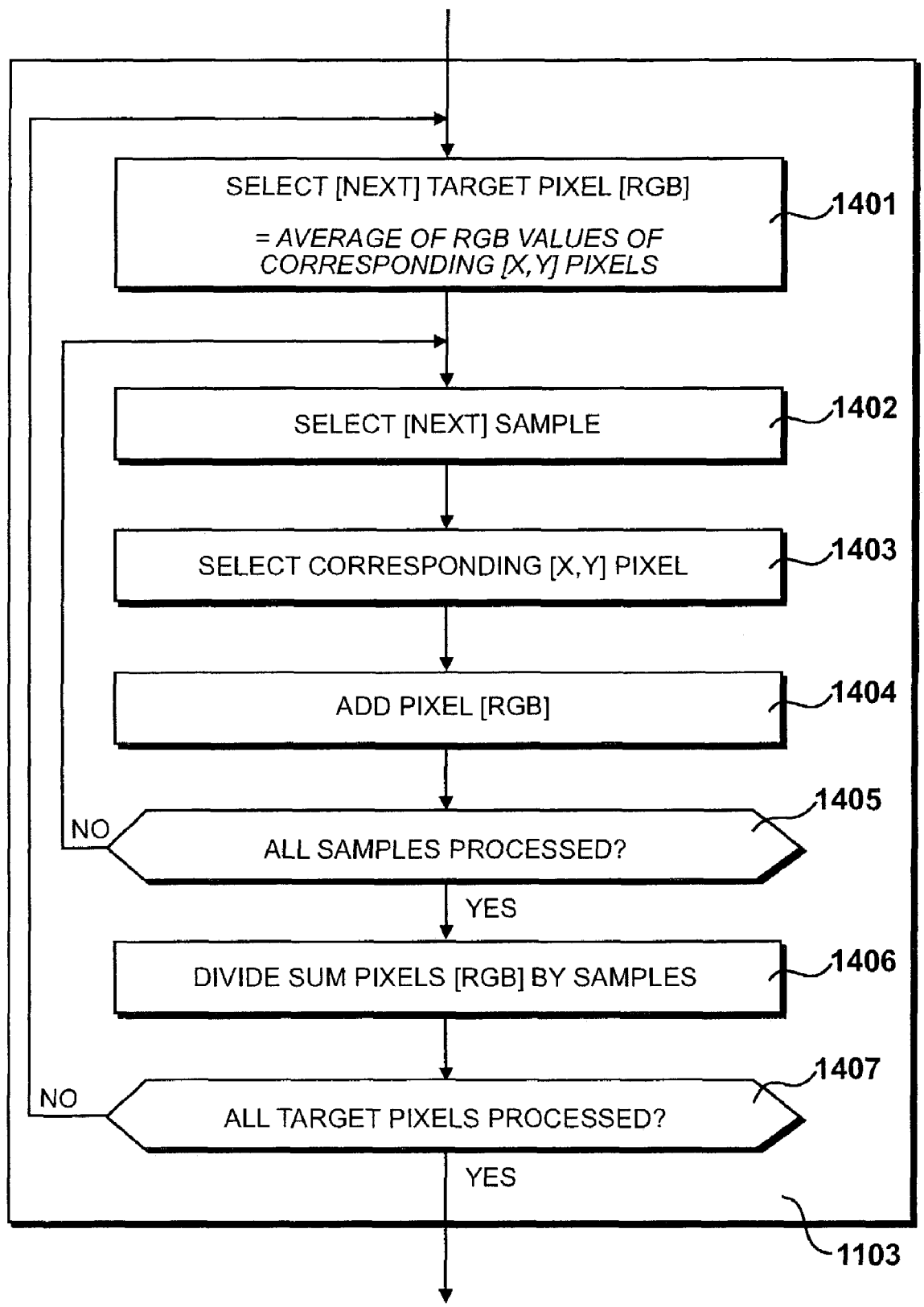
FIG. 14 details the processing steps according to which the samples shown in FIG. 13 are processed to generate output frame image data.

The processing steps according to which application 502 processes the samples stacked according to step 1205 to generate output frame image data 1310 at step 1206 are further detailed in FIG. 14.

At step 1401, the first target pixel of the output image frame 1310 is selected, the respective red, green and blue colour component values of which should equal the average of the respective red, green and blue colour component values of the pixels having the same two-dimensional co-ordinates in all of the samples stacked.

In order to generate said average, each sample is recursively selected at step 1402 such that the pixel therein having x, y co-ordinates equivalent to the x, y co-ordinates of the selected target pixel of step 1401 may be selected at step 1403 and its respective colour component values added at step 1404. At step 1405 a first question is asked as to whether all of the samples have been traversed and processed, thus providing total colour component values. If this question is answered in the affirmative then at step 1406 these totals are divided by the total number of samples traversed to obtain the final RGB colour component value of the target pixels selected at step 1401. Alternatively, if the question of step 1405 is answered in the negative, the next sample is selected at step 1402, traversed to identify the corresponding pixel at step 1403, the RGB values of which are added according to step 1404.

Having obtained final RGB colour component values for the target pixel currently selected at step 1401, a second question is asked at step 1407 as to whether all of the target pixels defining the target image frame have been processed, such that the next output image frame may be generated for the final output clip. If the question of step 1407 is answered in the negative control returns to step 1401, whereby the next pixel of the target image frame is selected and its final RGB colour component values calculated according to step 1402 to 1406.

Question 1407 is eventually answered in the affirmative, whereby an output image frame is generated which includes a plurality of objects, each of which has its own degree of motion blurring and is therefore independently motion blurred. In this example the degree of motion blurring of ship 707 is nil, but it can still considered to be an object to which motion blurring is applied, simply with a shutter length of zero.

If spaceships 614 and 617 had the same shutter length specified for them, for example one frame, then they would have the same degree of motion blurring. However, they would still be independently motion blurred since their sampling rates and positions would have been calculated independently of each other.

FIG. 15

Figure 15:
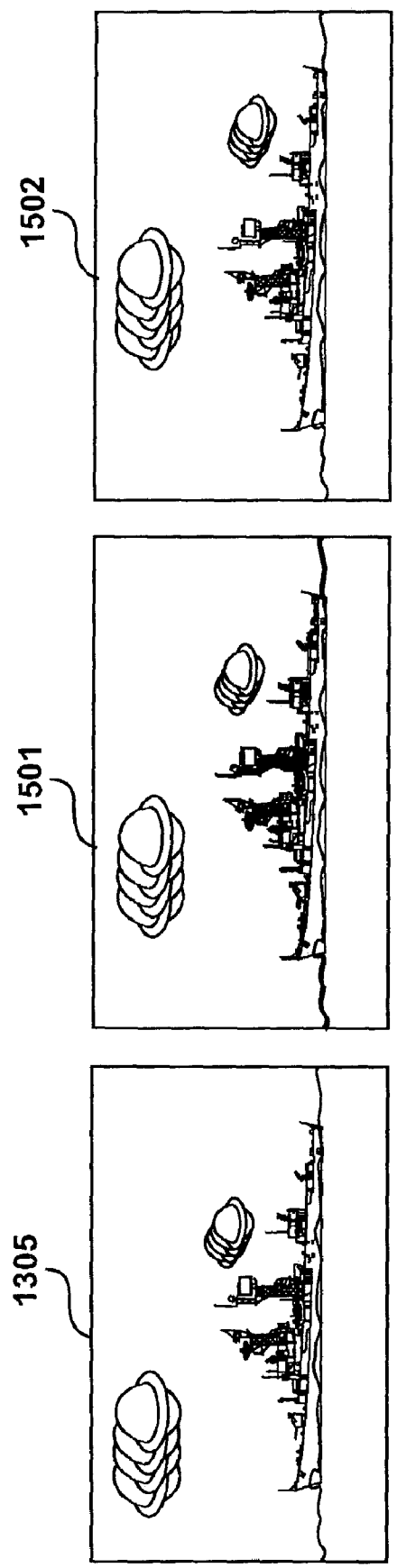
FIG. 15 graphically illustrates a clip of frames produced by the present embodiment of the invention.

Three frames of a clip of motion-blurred frames produced by rendering the objects in scene 710 at step 406 are shown in FIG. 15. These are the same frames as shown in FIG. 10A but with motion blurring applied.

The first frame 1305 is generated as shown in FIG. 13. The second frame 1501 is generated by stacking samples with the first spaceship at positions of two frames, two and a half frames, three frames and three and a half frames and the second spaceship at positions of two frames, two and a quarter frames, two and a half frames and two and three quarters frames. Player 704 is at a position of two frames throughout. The third frame 1502 is generated similarly.

Thus it can be seen that the motion blurring of spaceship 614 overlaps from frame to frame, whereas the motion blurring of spaceship 617 does not because it has a shutter speed of only one frame.

What is claimed is:

1. Apparatus for generating image data, comprising:
   memory means configured to store data defining a volume comprising a plurality of objects and at least one viewport, memory means configured to store motion data for each of said objects, configuration data for said viewport and instructions, and processing means configured by said instructions to perform the steps of:
   (a) for each of said objects, independently defining said motion data in response to user input as a shutter length and a motion path within said volume, wherein said shutter length is indicative of a number of frames to use to evaluate motion for each of said objects;
   (b) for each of said objects, calculating a position along said motion path at an interval of time, wherein said interval is dependent upon said shutter length for said object, and translating said object to said position within said volume;
   (c) rendering said objects through said viewport to produce a sample;
   (d) repeating steps (b) and (c) a user-defined number of times at different intervals to produce a number of samples, wherein said number of samples is independent from said shutter length; and
   (e) blending said samples to generate an image frame wherein each of said objects is independently motion-blurred.

2. Apparatus according to claim 1, wherein said motion path is defined by a continuous function.

3. Apparatus according to claim 1, wherein said motion pat is defined by a lookup table.

4. Apparatus according to claim 1, wherein said configuration data for said viewport comprises a view frustum and a focal length.

5. Apparatus according to claim 1, wherein for each of said objects said interval of time is a fraction of a frame.

6. Apparatus according to claim 5, wherein for each of said objects said fraction of a frame is calculated by dividing said shutter length by said user-defined number.

7. A method for generating image frames from data defining a volume including a plurality of objects and at least one viewport, comprising the steps of
   (a) for each of said objects, independently defining motion data in response to user input as a shutter length and a motion path within said volume, wherein said shutter length is indicative of a number of frames to use to evaluate motion for each of said objects;
   (b) for each of said objects, calculating a position along said motion path at an interval of time, wherein said interval is dependent upon said shutter length for said object, and translating said object to said position within said volume;
   (c) rendering said objects through said viewport to produce a sample;
   (d) repeating steps (b) and (c) a user-defined number of times at different intervals to produce a number of samples, wherein said number of samples is independent from said shutter length; and
   (e) blending said samples to generate an image frame wherein each of said objects is independently motion-blurred.

8. A method according to claim 7, wherein said motion path is defined by a continuous function.

9. A method according to claim 7, wherein said motion path is defined by a lookup table.

10. A method according to claim 7, wherein said configuration data for said viewport comprises a view frustum and a focal length.

11. A method according to claim 7, wherein for each of said objects said interval of time is a fraction of a frame.

12. A method according to claim 11, wherein for each of said objects said fraction of a frame is calculated by dividing said shutter length by said user-defined number.

13. A computer readable medium having computer readable instructions executable by a computer, such that said computer performs the steps of:
   (a) defining image data as a volume including a plurality of objects and at least one viewport;
   (b) for each of said objects, independently defining a shutter length and a motion path within said volume in response to user input, wherein said shutter length is indicative of a number of frames to use to evaluate motion for each of said object;
   (c) for each of said objects, calculating a position along said motion path at an interval of time, wherein said interval is dependent upon said shutter length for said object, and translating said object to said position within said volume;
   (d) rendering said objects trough said viewport to produce a sample;
   (e) repeating steps (c) and (d) a user-defined number of times at different intervals to produce a number of samples, wherein said number of samples is independent from said shutter length; and
   (f) blending said samples to generate an image frame wherein each of said objects is independently motion-blurred.

14. A computer-readable medium according to claim 13, wherein said motion path is defined by a continuous function.

15. A computer-readable medium according to claim 13, wherein said motion path is defined by a lookup table.

16. A computer-readable medium according to claim 13, wherein said configuration data for said viewport comprises a view frustum and a focal length.

17. A computer-readable medium according to claim 13, wherein for each of said objects said interval of time is a fraction of a frame.

18. A computer-readable medium according to claim 17, wherein for each of said objects said fraction of a frame is calculated by dividing said shutter length by said user-defined number.

19. A computer system programmed to generate image data, including memory means configured to store data as a volume comprising a least one object and at least one viewport, memory means configured to store motion data for said object, configuration data for said viewport and instructions, and processing means configured by said instructions to perform the steps of
   (a) for each of said objects, independently defining said motion data in response to user input as a shutter length and a motion path within said volume, wherein said shutter length is indicative of a number of frames to use to evaluate motion for each of said objects;
   (b) for each of said objects, calculating a position along said motion path at an interval of time, wherein said interval is dependent upon said shutter length for said object, and translating said object to said position within said volume;
   (c) rendering said objects through said viewport to produce a sample;
   (d) repeating steps (b) and (c) a user-defined number of times at different intervals to produce a number of samples, wherein said number of samples is independent from said shutter length; and
   (e) blending said samples to generate an image frame wherein each of said objects is independently motion-blurred.

20. A computer system programmed according to claim 19, wherein said motion path is defined by a continuous function.

21. A computer system programmed according to claim 19, wherein said motion path is defined by a lookup table.

22. A computer system programmed according to claim 19, wherein said configuration data for said viewport comprises a view frustum and a focal length.

23. A computer system programmed according to claim 19, wherein for each of said objects said interval of time is a fraction of a frame.

24. A computer system programmed according to claim 23, wherein for each of said objects said fraction of a frame is calculated by dividing said shutter length by said user-defined number.

* * * * *